(12) United States Patent
Higashiyama et al.

(10) Patent No.: US 11,585,556 B2
(45) Date of Patent: Feb. 21, 2023

(54) NETWORK SYSTEM

(71) Applicant: DAIKIN INDUSTRIES, LTD., Osaka (JP)

(72) Inventors: Shin Higashiyama, Osaka (JP); Hiroshi Dohmae, Osaka (JP)

(73) Assignee: Daikin Industries, Ltd., Osaka (JP)

( * ) Notice: Subject to any disclaimer, the term of this patent is extended or adjusted under 35 U.S.C. 154(b) by 0 days.

(21) Appl. No.: 17/599,240

(22) PCT Filed: Mar. 24, 2020

(86) PCT No.: PCT/JP2020/013128
§ 371 (c)(1),
(2) Date: Sep. 28, 2021

(87) PCT Pub. No.: WO2020/203494
PCT Pub. Date: Oct. 8, 2020

(65) Prior Publication Data
US 2022/0099324 A1    Mar. 31, 2022

(30) Foreign Application Priority Data

Mar. 29, 2019 (JP) .............................. JP2019-067795

(51) Int. Cl.
*F24F 11/58* (2018.01)
*F24F 11/88* (2018.01)
(Continued)

(52) U.S. Cl.
CPC .............. *F24F 11/58* (2018.01); *F24F 11/54* (2018.01); *F24F 11/88* (2018.01); *H04L 12/46* (2013.01)

(58) Field of Classification Search
CPC . F24F 11/58; F24F 11/54; F24F 11/88; H04L 12/46
See application file for complete search history.

(56) References Cited

U.S. PATENT DOCUMENTS

2001/0007118 A1* 7/2001 Matsuda ............. H04L 12/6418
710/305
2002/0119797 A1* 8/2002 Woodhead .......... H04W 52/362
455/522
(Continued)

FOREIGN PATENT DOCUMENTS

EP       3116087 A1    1/2017
JP    2006-29642 A     2/2006
(Continued)

OTHER PUBLICATIONS

International Search Report, issued in PCT/JP2020/013128, PCT/ISA/210, dated Jun. 16, 2020.
(Continued)

*Primary Examiner* — Kidest Bahta
(74) *Attorney, Agent, or Firm* — Birch, Stewart, Kolasch & Birch, LLP

(57) ABSTRACT

In a network in which devices are classified into a plurality of layers, a physical first line is connected to an outdoor unit and a first indoor unit, which are first-layer devices, and a physical second line is connected to a second indoor unit, which is a second-layer device. A first intermediary unit, which is a first intermediary device, includes a first filter always connected to the first line and the second line. The first intermediary unit communicates with the outdoor unit and the second indoor unit via a first signal. The first filter is installed so as not to attenuate a high-frequency first signal used for communication among the outdoor unit, the first indoor unit, the first intermediary unit, and the second indoor unit and so as to attenuate a low-frequency second signal used for communication between the first intermediary unit and the second indoor unit.

15 Claims, 9 Drawing Sheets

(51) Int. Cl.
  *F24F 11/54* (2018.01)
  *H04L 12/46* (2006.01)

(56) References Cited

U.S. PATENT DOCUMENTS

| | | | | |
|---|---|---|---|---|
| 2009/0145147 A1* | 6/2009 | Kojima | ................ | F24F 1/0003 |
| | | | | 62/157 |
| 2012/0033745 A1* | 2/2012 | Jo | ........................... | F24F 11/62 |
| | | | | 375/257 |
| 2013/0325191 A1* | 12/2013 | Mukai | ................... | G05B 13/02 |
| | | | | 700/276 |
| 2015/0000310 A1* | 1/2015 | Lee | ........................ | F25B 49/02 |
| | | | | 62/56 |
| 2017/0009743 A1* | 1/2017 | Brogan | .................... | H02J 3/36 |

FOREIGN PATENT DOCUMENTS

| | | |
|---|---|---|
| JP | 2006-319863 A | 11/2006 |
| JP | 2007-129661 A | 5/2007 |
| JP | 2015-227734 A | 12/2015 |
| JP | 2016-219983 A | 12/2016 |

OTHER PUBLICATIONS

International Preliminary Report on Patentability and English translation of the Written Opinion of the International Searching Authority dated Oct. 14, 2021 for Application No. PCT/JP2020/013128.
Extended European Search Report for European Application No. 20782194.3, dated Apr. 21, 2022.

\* cited by examiner

NETWORK SYSTEM

TECHNICAL FIELD

The present disclosure relates to a network system

BACKGROUND ART

In the related art, there are known network systems for performing information transmission between devices, examples of which include, as described in PTL 1 (Japanese Unexamined Patent Application Publication No. 2016-219983), a network system for performing information transmission between a plurality of air-conditioning indoor units and a plurality of air-conditioning outdoor units. In such a network system, a plurality of devices such as a plurality of air-conditioning indoor units and a plurality of air-conditioning outdoor units are connected by physical lines, and information is transmitted via a communication signal carried over the physical lines.

In a network in which a plurality of devices are connected by a communication line, the plurality of devices may be divided into a plurality of layers, for example, a first layer and a second layer, with an intermediary device therebetween, the intermediary device being disposed in the middle of the network. In such a network, in some cases, it is desired to perform overall communication using a common line without distinguishing between devices belonging to the first layer and devices belonging to the second layer. In such a network, furthermore, in some cases, it is desired to perform communication among only devices belonging to the first layer using the line described above. In such a network, furthermore, in some cases, it is desired to perform communication among only devices belonging to the second layer using the line described above.

SUMMARY OF INVENTION

Technical Problem

In such a network system, however, if the same communication line is used, a signal transmitted from a device belonging to the first layer may be received by a device belonging to the second layer, and communication desired to be performed among devices belonging to the first layer may not be successful. Likewise, if the same communication line is used, a signal transmitted from a device belonging to the second layer may be received by a device belonging to the first layer, and communication desired to be performed among devices belonging to the second layer may not be successful.

Accordingly, it is conceivable that the communication line is separated by an intermediary device and the intermediary device has a function of transferring a communication signal. If the intermediary device has a function of transferring a communication signal, however, in a case where it is desired to perform overall communication without distinguishing between devices belonging to the first layer and devices belonging to the second layer, a failure in the intermediary device may cause a failure in communication between devices belonging to different layers.

It is an object to improve the reliability of communication in a network in which a plurality of devices are classified into a plurality of layers, in a case where communication independent of the layers and communication within the layers are performed through physical lines.

Solution to Problem

A network system according to a first aspect includes a first-layer device, a first line, a second-layer device, a second line, and a first intermediary device. The first line is connected to the first-layer device. The second line is connected to the second-layer device. The first intermediary device includes a first filter always connected to the first line and the second line, and is configured to communicate with the first-layer device and the second-layer device. The first filter is installed so as not to attenuate a high-frequency first signal used for communication among the first-layer device, the first intermediary device, and the second-layer device and so as to attenuate a low-frequency second signal used for communication between the first intermediary device and the second-layer device, other than the first-layer device.

In the network system according to the first aspect, since the first line and the second line can always be connected by the first filter, even if a failure has occurred in the first intermediary device, a state can be maintained in which communication is possible between the first-layer device and the second-layer device. As a result, the network system can improve the reliability of communication.

A network system according to a second aspect is the system according to the first aspect, in which the second-layer device is a plurality of indoor units that air-condition an inside of a room.

In the network system according to the second aspect, even if a failure has occurred in the first intermediary device, a state can be maintained in which communication with the plurality of indoor units is possible, and it is possible to prevent a failure caused due to, for example, the plurality of indoor units being no longer controllable.

A network system according to a third aspect is the system according to the first aspect or the second aspect, further including a third-layer device, a third line, and a second intermediary device. The third line is connected to the third-layer device. The second intermediary device includes a second filter always connected to the second line and the third line, and is configured to communicate with the first intermediary device and the third-layer device. The second filter is installed so as not to attenuate the high-frequency first signal used for communication among the first-layer device, the first intermediary device, the second-layer device, the second intermediary device, and the third-layer device and so as to attenuate a low-frequency third signal used for communication between the second intermediary device and the third-layer device, other than the first-layer device, the first intermediary device, and the second-layer device.

In the network system according to the third aspect, since the second line and the third line can always be connected by the second filter, even if a failure has occurred in the second intermediary device, a state can be maintained in which communication is possible between the second-layer device and the third-layer device.

A network system according to a fourth aspect is the system according to the third aspect, in which the first-layer device is an outdoor unit or a centralized controller capable of controlling the second-layer device and the third-layer device.

In the network system according to the fourth aspect, even if a failure has occurred in the first intermediary device and/or the second intermediary device, a state can be maintained in which the outdoor unit or the centralized controller can communicate with the plurality of indoor units. In the network system according to the fourth aspect, it is possible to prevent a failure caused by, for example, the outdoor unit or the centralized controller being no longer able to control the plurality of indoor units.

A network system according to a fifth aspect is the system according to any one of the first to fourth aspects, in which the first intermediary device recognizes the second-layer device using the second signal. The first-layer device recognizes the second-layer device via communication with the first intermediary device.

In the network system according to the fifth aspect, the first-layer device can recognize the second-layer device connected to the first intermediary device by the second line through the first intermediary device. For example, even if another device is connected between the first-layer device and the first intermediary device, the first-layer device can recognize and manage the second-layer device in a way distinguishable from the other device.

DESCRIPTION OF EMBODIMENTS

First Embodiment (1) Overall Configuration

Figure 1:
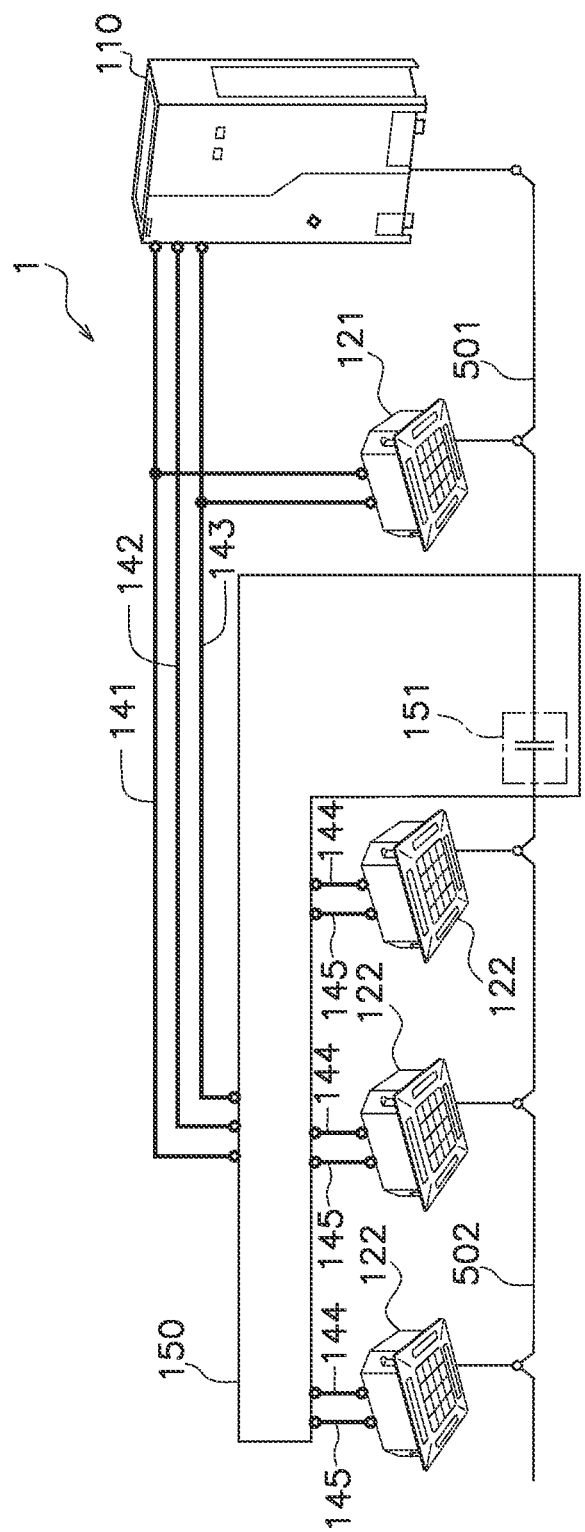
FIG. 1 is a conceptual diagram illustrating an overview of an example configuration of an air conditioning system according to a first embodiment.
Figure 2:
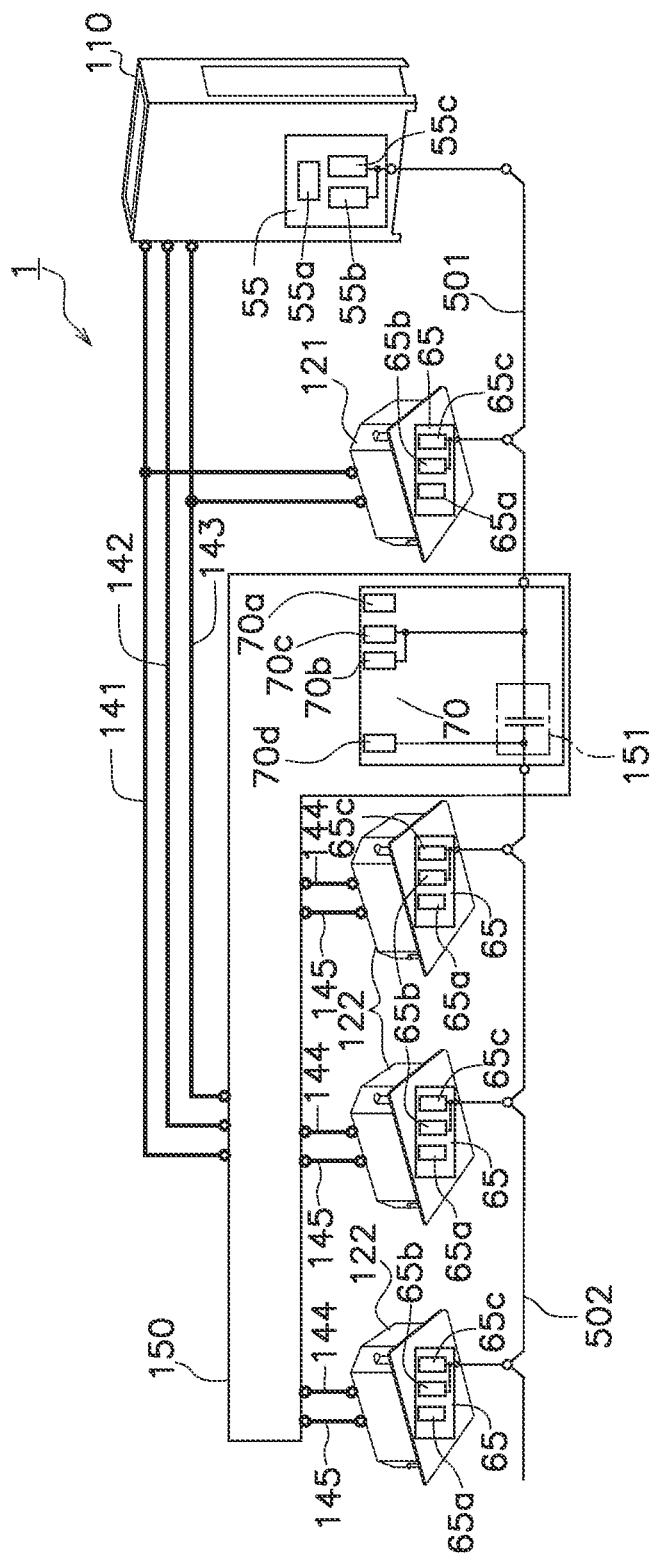
FIG. 2 is a circuit diagram of the air conditioning system illustrated in FIG. 1.

A network system according to a first embodiment will be described with reference to an air conditioning system 1 illustrated in FIG. 1. The air conditioning system 1 according to the first embodiment includes an outdoor unit 110, one first indoor unit 121, a first intermediary unit 150, a plurality of second indoor units 122, a first line 501, and a second line 502.

The outdoor unit 110 and the first indoor unit 121 are first-layer devices. The first line 501 is a physical wire. The first line 501 is connected to the outdoor unit 110 and the first indoor unit 121. The plurality of second indoor units 122 are second-layer devices. The second line 502 is a physical wire. The second line 502 is connected to the plurality of second indoor units 122. The first line 501 and the second line 502 may be each constituted by a plurality of wires extending in parallel.

The first intermediary unit 150 includes a first filter 151. The first filter 151 is always connected to the first line 501 and the second line 502. The first intermediary unit 150 is configured to be capable of communicating with the outdoor unit 110, which is a first-layer device, via a second signal. The first intermediary unit 150 is a first intermediary device.

The first filter 151 does not attenuate a high-frequency first signal, which is used for communication among the outdoor unit 110, the first indoor unit 121, the first intermediary unit 150, and the plurality of second indoor units 122. The first filter 151 attenuates a low-frequency second signal, which is used for communication between the first intermediary unit 150 and the plurality of second indoor units 122, other than the outdoor unit 110 and the first indoor unit 121. In the present disclosure, high frequencies are defined to be frequencies higher than or equal to 100 kHz, and low frequencies are defined to be frequencies lower than or equal to 10 kHz. The low frequencies include 0 kHz (direct current). The first filter 151 is installed so as not to attenuate a high-frequency first signal and so as to attenuate a low-frequency second signal, which indicates that, for example, the first filter 151 is installed so that the attenuation factor for the high-frequency first signal is smaller than the attenuation factor for the low-frequency second signal.

The first filter 151 is a device that passes high-frequency signals and blocks low-frequency signals. Examples of the filter that passively passes high-frequency signals and blocks low-frequency signals include a capacitor, and an attenuator that attenuates low-frequency signals. The filter used as the first filter 151 may be an active filter including an active element. For example, an inductive coupler that passes high-frequency signals and blocks direct-current signals can also be used as the first filter 151. There is a switching device that switches connection and disconnection between the first line 501 and the second line 502. The switching device is a device that disconnects the first line 501 and the second line 502 from each other to carry a low-frequency signal over the first line 501 and the second line 502. In the switching device, for example, a relay can be used to switch connection and disconnection between the first line 501 and the second line 502.

FIG. 1 exemplarily illustrates a case where one first indoor unit 121 is used. However, the air conditioning system 1 may be configured to include a plurality of first indoor units 121. Alternatively, the air conditioning system 1 may be configured not to include the first indoor unit 121.

(2) Overview of Air Conditioning Operation of Air Conditioning System 1 According to First Embodiment In the air conditioning system 1 according to the first embodiment, refrigerant circulates among the outdoor unit 110, the first indoor unit 121, the first intermediary unit 150, and the plurality of second indoor units 122. To circulate refrigerant, the air conditioning system 1 includes refrigerant pipes 141, 142, 143, 144, and 145. The outdoor unit 110 and the first indoor unit 121 are connected by the refrigerant pipes 141 and 143. The outdoor unit 110 and the first intermediary unit 150 are connected by the refrigerant pipes 141, 142, and 143. The second indoor units 122 and the first intermediary unit 150 are connected by the refrigerant pipes 144 and 145. In the air conditioning system 1, a vapor compression refrigeration cycle is performed by the circulation of the refrigerant. In the air conditioning system 1, the circulation of the refrigerant causes thermal energy transfer between the outdoor unit 110, and the first indoor unit 121 and the plurality of second indoor units 122.

While the internal configuration of the outdoor unit 110 is not illustrated, the outdoor unit 110 is configured to include, for example, a compressor, a four-way valve, a heat exchanger, an expansion valve, and a fan. The outdoor unit 110 is a device that performs heat exchange between outdoor air and the refrigerant. The outdoor unit 110 sucks gaseous refrigerant flowing through the refrigerant pipe 143 and supplies low-temperature liquid refrigerant flowing through the refrigerant pipe 141 and high-temperature gaseous refrigerant flowing through the refrigerant pipe 142.

While the internal configuration of the first indoor unit 121 and the second indoor units 122 is not illustrated, each of the first indoor unit 121 and the second indoor units 122 includes, for example, a heat exchanger, an expansion valve, and a fan. The first indoor unit 121 and the second indoor units 122 are each a device that performs heat exchange between indoor air and the refrigerant. In each of the first indoor unit 121 and the second indoor units 122, for example, the heat exchanger exchanges heat between the refrigerant and the indoor air, and the fan blows heat-exchanged air to the outside. The first indoor unit 121 and the second indoor units 122 perform cooling using low-temperature refrigerant or perform heating using high-temperature refrigerant.

The first intermediary unit 150 is a device that adjusts refrigerant to be caused to flow into the plurality of second indoor units 122 connected to the first intermediary unit 150, such as switching the flow of the refrigerant to be caused to flow into the plurality of second indoor units 122.

(3) Detailed Configuration (3-1) Configuration of Air Conditioning System 1 for Communication The outdoor unit 110 includes an outdoor controller 55. The outdoor controller 55 includes a microcontroller unit (MCU) 55a, a transmitter 55b, and a transceiver 55c. The transmitter 55b and the transceiver 55c of the outdoor unit 110 are connected to the first line 501.

The first indoor unit 121 includes an indoor controller 65. The indoor controller 65 includes a microcontroller unit (MCU) 65a, a receiver 65b, and a transceiver 65c. The receiver 65b and the transceiver 65c of the first indoor unit 121 are connected to the first line 501.

Each of the second indoor units 122 includes an indoor controller 65. The indoor controller 65 includes a microcontroller unit (MCU) 65a, a receiver 65b, and a transceiver 65c. The receivers 65b and the transceivers 65c of the second indoor units 122 are connected to the second line 502.

The first intermediary unit 150 includes an intermediary controller 70. The intermediary controller 70 includes a microcontroller unit (MCU) 70a, a receiver 70b, a transceiver 70c, and a transmitter 70d. The receiver 70b and the transceiver 70c of the first intermediary unit 150 are connected to the first line 501. The transmitter 70d of the first intermediary unit 150 is connected to the second line 502.

The transceivers 55c, 65c, and 70c perform communication via high-frequency first signals. The transmitters 55b and 70d and the receivers 65b and 70b perform communication via low-frequency second signals.

An MCU includes, for example, a control arithmetic unit and a storage device (memory). The control arithmetic unit can be implemented using a processor such as a CPU or a GPU. The control arithmetic unit reads a program stored in the storage device and performs predetermined image processing and arithmetic processing in accordance with the program. Further, the control arithmetic unit can write an arithmetic result to the storage device or read information stored in the storage device in accordance with the program.

(3-2) Communication for System Recognition

As described above, the air conditioning system 1 circulates refrigerant to perform air conditioning. Before performing the air conditioning operation, the air conditioning system 1 recognizes a communication target in accordance with the circulation of the refrigerant. The recognition of the communication target in accordance with the circulation of the refrigerant is system recognition. Communication of the air conditioning system 1 for performing system recognition will be described with reference to FIG. 3.

First, to perform communication for system recognition, the power source for the air conditioning system 1 is turned on (step ST1). The outdoor controller 55, the plurality of indoor controllers 65, and the intermediary controller 70, which are connected to the first line 501 and the second line 502, establish a network (step ST2). For example, the outdoor controller 55 uses the transceiver 55c to transmit and receive communication signals to and from the transceivers 65c of the plurality of indoor controllers 65 and the transceiver 70c of the intermediary controller 70 to establish a network.

After the network is established, the outdoor unit 110, the first indoor unit 121, the plurality of second indoor units 122, and the first intermediary unit 150 each acquire a communication address (step ST3). The MCU 55a of the outdoor controller 55, the MCUs 65a of the plurality of indoor controllers 65, and the MCU 70a of the intermediary controller 70 have a function of, for example, automatically acquiring a communication address. Using this function, the outdoor unit 110, the first indoor unit 121, the plurality of second indoor units 122, and the first intermediary unit 150 can acquire communication addresses that do not overlap each other.

The outdoor unit 110 and the first intermediary unit 150 cooperate with each other via communication using the transceiver 55c and the transceiver 70c and select one recognition device on the network (step ST4). Here, for example, the outdoor unit 110 is selected. When the outdoor unit 110 is selected, the first intermediary unit 150 changes the role from a recognition device to a recognition-target device. Changing the role from a recognition device to a recognition-target device means entering a state in which the receiver 70b is ready to receive a second signal sent from the transmitter 55b of the outdoor unit 110.

The selected recognition device uses the transmitter to transmit a second signal to devices in the layer to which the recognition device belongs for refrigerant system recognition (step ST5). For example, in a case where the outdoor unit 110 is selected, the outdoor unit 110 uses the transmitter 55b to transmit a second signal to the first line 501 for refrigerant system recognition. The second signal transmitted from the transmitter 70 is a low-frequency signal and is thus difficult to pass through the first filter 151. In other words, the second signal is attenuated by the first filter 151 and thus is not received as a valid signal at the receivers 65b of the second indoor units 122. In other words, furthermore, due to the attenuation effect of the first filter 151, the second signal transmitted from the transmitter 55b of the outdoor controller 55 of the outdoor unit 110 is not receivable at the receivers 65b of the second indoor units 122. The outdoor unit 110 transmits its communication address via a first signal by using the transceiver 55c simultaneously with the transmission of the second signal or before or after the transmission of the second signal. In this case, the outdoor unit 110 may be configured to send the communication address via a low-frequency signal having a frequency other than 0.

The first indoor unit 121, which has received the second signal at the receiver 65b and has received the communication address of the outdoor unit 110 at the transceiver 65c or the receiver 65b through the first line 501, stores the received communication address in a memory of the MCU 65a. The first intermediary unit 150, which has received the second signal at the receiver 70b and has received the communication address of the outdoor unit 110 at the transceiver 70c or the receiver 70b through the first line 501, stores the received communication address in a memory of the MCU 70a.

A recognition-target device that has received the second signal and the communication address of the recognition device transmits its communication address to the communication address of the recognition device (step ST6). In a case where the outdoor unit 110 is selected, the first indoor unit 121 and the first intermediary unit 150 transmit their communication addresses to the communication address of the outdoor unit 110 through the first line 501 by using the transceiver 65c and the transceiver 70c.

The selected recognition device registers the sent communication address of the recognition-target device in the same system list in which indoor units in the same layer are registered (step ST7). In a case where the outdoor unit 110 is selected, the outdoor unit 110 sequentially adds the communication addresses of the first indoor unit 121 and the first intermediary unit 150, which are sent to the communication address of the outdoor unit 110 through the first line 501, to the same system list. The outdoor unit 110 holds the same system list, thereby recognizing that the outdoor unit 110 is a first-layer device belonging to the first layer.

The selected recognition device notifies, upon completion of the registration of all the recognition-target devices in the layer to which the recognition device belongs, the entire network that the system recognition for the layer to which the recognition device belongs is completed (step ST8). In a case where the outdoor unit 110 is selected, upon completion of the registration of the first indoor unit 121 in the first layer and the first intermediary unit 150, the outdoor unit 110 notifies the entire network that the system recognition for the first layer is completed, through the first line 501 and the second line 502 by using the transceiver 55c.

It is determined whether there is a recognition device that has not completed system recognition (step ST9). In a case where the outdoor unit 110 is selected, even if the outdoor unit 110 has first completed the system recognition, the first intermediary unit 150 has not completed the system recognition for the second layer (Yes in step ST9). In such a case, the outdoor unit 110 and the first intermediary unit 150 cooperate with each other via communication using the transceiver 55c and the transceiver 70c and select the first intermediary unit 150 as a recognition device (step ST4).

If the first intermediary unit 150 is selected as a recognition device, the first intermediary unit 150 changes the role from a recognition-target device to a recognition device. The selected first intermediary unit 150 uses the transmitter 70d to transmit a second signal to devices in a layer lower than the layer of the first intermediary unit 150 through the second line 502 (step ST5). The second signal transmitted from the transmitter 55b is a low-frequency signal and is thus difficult to pass through the first filter 151. In other words, due to the attenuation effect of the first filter 151, the second signal transmitted from the transmitter 70d of the intermediary controller 70 of the first intermediary unit 150 is not receivable at the receiver 65b of the first indoor unit 121. The first intermediary unit 150 uses the transceiver 70c to transmit its communication address via a first signal simultaneously with the transmission of the second signal or before or after the transmission of the second signal. In this case, the first intermediary unit 150 may be configured to send the communication address via a low-frequency signal having a frequency other than 0. The plurality of second indoor units 122, which have received the second signal at the receivers 65b and have received the communication address of the first intermediary unit 150 at the transceivers 65c or the receivers 65b through the second line 502, store the received communication address in memories of the respective MCU 65a.

The plurality of second indoor units 122, which have received the second signal and the communication address of the first intermediary unit 150, transmit their communication addresses to the communication address of the first intermediary unit 150 (step ST6). The first intermediary unit 150 registers the communication addresses of the plurality of second indoor units 122, which are sent through the second line 502, in the same system list in which second-layer devices in the second layer are registered (step ST7).

The first intermediary unit 150 notifies, upon completion of the registration of all of the second indoor units 122 in the second layer, the entire network that the system recognition for the second layer is completed (step ST8). The first intermediary unit 150 notifies the entire network that the system recognition for the second layer is completed through the first line 501 and the second line 502 by using the transceiver 70c. At this time, the first intermediary unit 150 transmits the communication addresses of the second indoor units 122 in the second layer to the MCU 55a of the outdoor controller 55 of the outdoor unit 110 through the first line 501 by using the transceiver 70c. The outdoor unit 110 registers the communication addresses of the plurality of second indoor units 122, which are received from the first intermediary unit 150, in the same system list as the communication addresses of the second-layer devices.

The determination of whether there is a recognition device that has not completed system recognition (step ST9) is performed after the outdoor unit 110 and the first intermediary unit 150 have completed the system recognition. Accordingly, since all of the recognition devices illustrated in FIG. 1, namely, the outdoor unit 110 and the first intermediary unit 150, have completed the system recognition (No in step ST9), the air conditioning system 1 terminates the communication for system recognition.

The foregoing description of an example of the communication for system recognition presents a case where a communication destination and/or a communication source is identified using communication addresses in communication performed by the transceivers 55c, 65c, and 70c using communication signals through the first line 501 and the second line 502. However, the identification of a communication destination and/or a communication source is not limited to the identification using communication addresses. For example, the air conditioning system 1 may be configured to identify a communication destination and/or a communication source using unique IDs of the outdoor unit 110, the first indoor unit 121, the plurality of second indoor units 122, and the first intermediary unit 150.

(3-3) Communication after System Recognition

When the system recognition is completed, the communication address of the first indoor unit 121 connected to the first line 501 is registered as a first-layer device, and the communication addresses of the second indoor units 122 are registered as second-layer devices, and the communication address of the first intermediary unit 150 is registered as a first intermediary device in the same system list in the MCU 55a of the outdoor unit 110.

The outdoor unit 110 can use the same system list stored in the MCU 55a to identify the first indoor unit 121, the plurality of second indoor units 122, and the first intermediary unit 150 belonging to the same refrigerant system and control the vapor compression refrigeration cycle of the refrigerant system. In addition, the outdoor unit 110 can use the same system list to send instructions to the first indoor unit 121, which is a first-layer device, the plurality of second indoor units 122, which are second-layer devices, and the first intermediary unit 150, which is a first intermediary device, in a distinguishable manner using communication signals through the first line 501 and the second line 502.

For example, if the discharge temperature of the compressor of the outdoor unit 110 becomes abnormally high, the outdoor unit 110 can use the transceiver 55c to instruct the first indoor unit 121, the plurality of second indoor units 122, and the first intermediary unit 150, which are registered in the same system list, to address the abnormal discharge temperature of the compressor using communication signals through the first line 501 and the second line 502.

For example, the outdoor unit 110 can use the transceiver 55c to instruct only the first indoor unit 121, which is a first-layer device registered in the same system list, to change the air conditioning capacity using a communication signal through the first line 501. The outdoor unit 110 can further use the transceiver 55c to instruct the plurality of second indoor units 122, which are second-layer devices, and the first intermediary unit 150, which are registered in the same system list, to change the air conditioning capacity using communication signals through the first line 501 and the second line 502.

Second Embodiment

Figure 4:
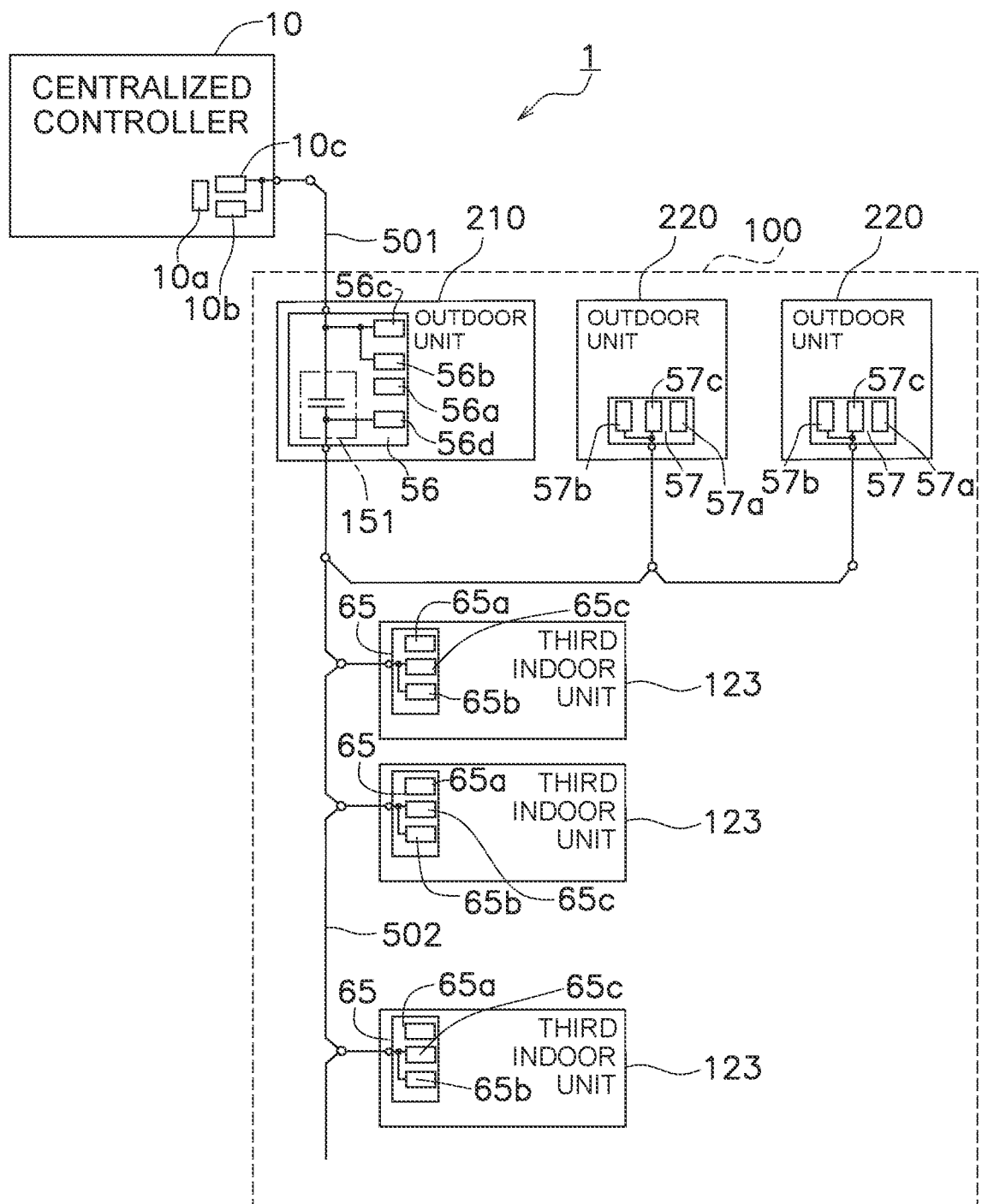
FIG. 4 is a circuit diagram illustrating an overview of an example configuration of an air conditioning system according to a second embodiment.

The first embodiment described above presents a case where the outdoor unit 110 and the first indoor unit 121 are first-layer devices, the first intermediary unit 150 is a first intermediary device, and the plurality of second indoor units 122 are second-layer devices. However, a first-layer device, a second-layer device, and a first intermediary device are not limited to those in the first embodiment. For example, an air conditioning system 1 according to a second embodiment illustrated in FIG. 4 may be used.

(4) Overall Configuration

The air conditioning system 1 according to the second embodiment includes a centralized controller 10, an outdoor unit 210, a plurality of outdoor units 220, a plurality of third indoor units 123, a first line 501, and a second line 502. In the air conditioning system 1 according to the second embodiment, the centralized controller 10 is a first-layer device, the outdoor unit 210 is a first intermediary device, and the plurality of outdoor units 220 and the plurality of third indoor units 123 are second-layer devices. The first line 501 and the second line 502 are physical wires. The first line 501 is connected to the centralized controller 10 and the outdoor unit 210. The second line 502 is connected to the plurality of outdoor units 220 and the plurality of third indoor units 123.

The outdoor unit 210 includes a first filter 151. The first filter 151 is always connected to the first line 501 and the second line 502. The outdoor unit 210 communicates with the centralized controller 10, which is a first-layer device, and also communicates with the plurality of outdoor units 220 and the plurality of third indoor units 123, which are second-layer devices. The relationship between a first signal and a second signal, which are used for communication in the air conditioning system 1, and the relationship between these signals and the first filter 151 are similar to those in the first embodiment.

(5) Overview of Air Conditioning Operation of Air Conditioning System 1 According to Second Embodiment In the air conditioning system 1 according to the second embodiment, refrigerant circulates among the outdoor unit 210, the plurality of outdoor units 220, and the plurality of third indoor units 123. In the air conditioning system 1, a vapor compression refrigeration cycle is performed by such circulation of the refrigerant. In the air conditioning system 1, the circulation of the refrigerant causes thermal energy transfer between the outdoor units 210 and 220 and the third indoor units 123. Each of the third indoor units 123 includes a heat exchanger (not illustrated). In each of the third indoor units 123, the heat exchanger exchanges heat between the refrigerant and indoor air to perform at least one of cooling, heating, and dehumidification of the indoor space.

(6) Detailed Configuration (6-1) Configuration of Air Conditioning System 1 for Communication The centralized controller 10 includes a microcontroller unit (MCU) 10a, a transmitter 10b, and a transceiver 10c. The transmitter 10b and the transceiver 10c of the centralized controller 10 are connected to the first line 501.

The outdoor unit 210 includes an outdoor controller 56. The outdoor controller 56 includes a microcontroller unit (MCU) 56a, a receiver 56b, a transceiver 56c, and a transmitter 56d. The receiver 56b and the transceiver 56c of the outdoor unit 210 are connected to the first line 501. The transmitter 56d of the outdoor unit 210 is connected to the second line 502.

Each of the outdoor units 220 includes an outdoor controller 57. The outdoor controller 57 includes a microcontroller unit (MCU) 57a, a receiver 57b, and a transceiver 57c. The receivers 57b and the transceivers 57c of the outdoor units 220 are connected to the second line 502.

Each of the third indoor units 123 includes an indoor controller 65. The indoor controller 65 includes a microcontroller unit (MCU) 65a, a receiver 65b, and a transceiver 65c. The receivers 65b and the transceivers 65c of the third indoor units 123 are connected to the second line 502.

The transceivers 10c, 56c, 57c, and 65c perform communication via high-frequency first signals. The transmitter 10b and the receiver 56b perform communication via low-frequency second signals, and the transmitter 56d and the receivers 57b and 65b perform communication via low-frequency second signals.

(6-2) Communication for System Recognition

Communication for system recognition according to the second embodiment can be performed by an operation similar to the operation of communication for system recognition according to the first embodiment. In the air conditioning system 1 according to the second embodiment, the operation of the transmitter 55b and the transceiver 55c of the outdoor controller 55 according to the first embodiment is performed by the transmitter 10b and the transceiver 10c of the centralized controller 10 according to the second embodiment. The operation of the receiver 70b, the transceiver 70c, and the transmitter 70d of the intermediary controller 70 according to the first embodiment is performed by the receiver 56b, the transceiver 56c, and the transmitter 56d of the outdoor controller 56 according to the second embodiment. The operation of the receivers 65b and the transceivers 65c of the indoor controllers 65 of the second indoor units 122 according to the first embodiment is performed by the receivers 57b and the transceivers 57c of the outdoor controllers 57 and the receivers 65b and the transceivers 65c of the indoor controllers 65 according to the second embodiment. Also in the air conditioning system 1 according to the second embodiment, the communication for system recognition can be performed in accordance with the flowchart illustrated in FIG. 3.

In the air conditioning system 1 according to the second embodiment, the centralized controller 10 is a recognition device, and the outdoor unit 210 is a device having two aspects, namely, a recognition device and a recognition-target device. In the second embodiment, the plurality of outdoor units 220 and the plurality of third indoor units 123 are recognition-target devices. In the second embodiment, the centralized controller 10 performs system recognition to recognize devices belonging to a refrigerant system 100. Although there is no first-layer device to be registered in the same system list in the centralized controller 10, the centralized controller 10 holds the same system list, thereby recognizing that the centralized controller 10 is a first-layer device belonging to the first layer. The centralized controller 10 may be configured to notify the outdoor units 210 and 220 of devices belonging to the refrigerant system 100 recognized by the centralized controller 10.

Third Embodiment

Figure 5:
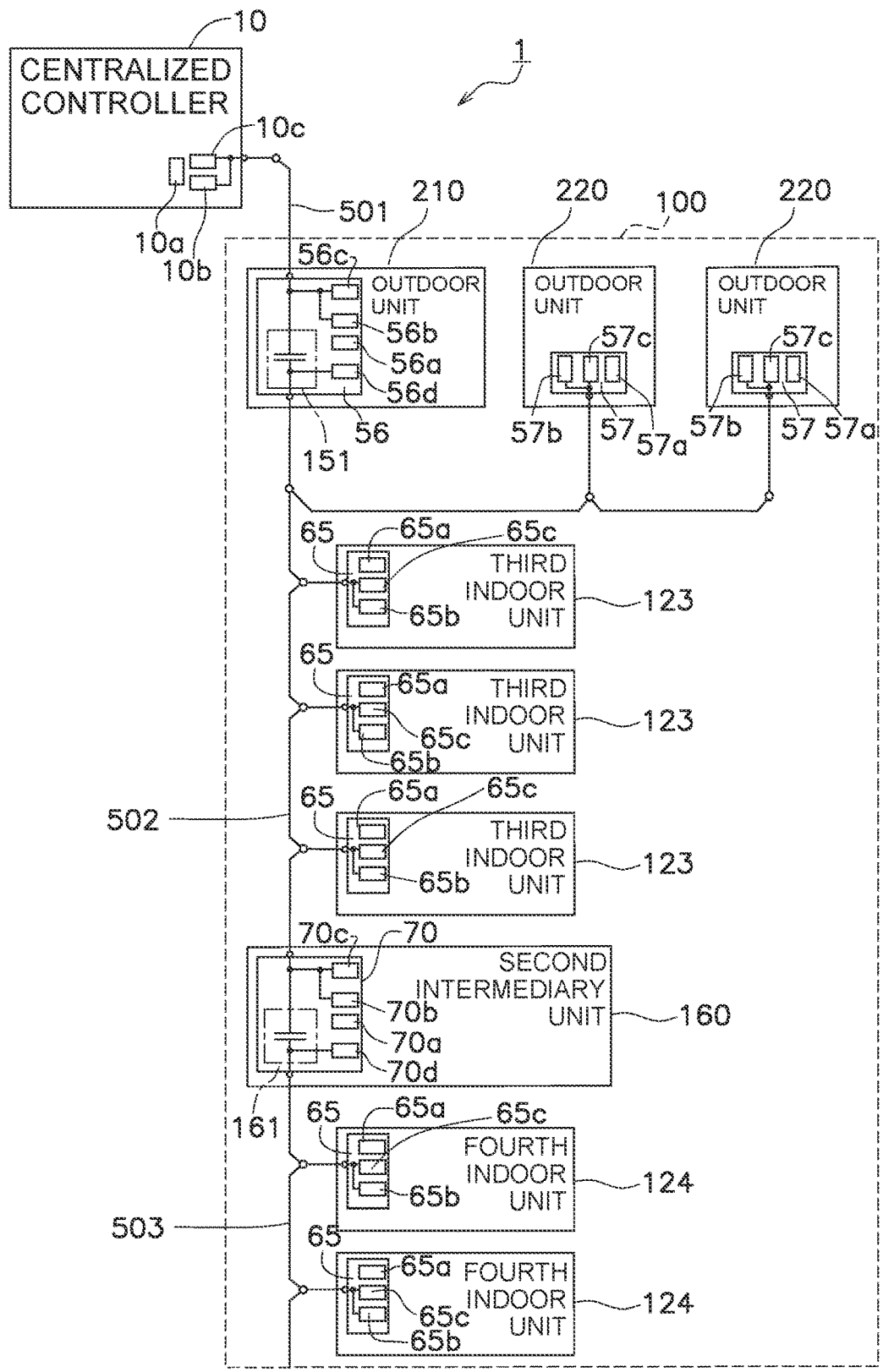
FIG. 5 is a circuit diagram illustrating an overview of an example configuration of an air conditioning system according to a third embodiment.

The first embodiment and the second embodiment described above present a case where the air conditioning system 1 includes two layers including the first-layer device(s) and the second-layer devices. However, an air conditioning system according to the present disclosure may not necessarily include two layers, and may include three or more layers. In the third embodiment described above, as illustrated in FIG. 5, a second intermediary unit 160, which is a second intermediary device, and fourth indoor units 124, which are third-layer devices, are installed in positions lower than the third indoor units 123, which are second-layer devices according to the second embodiment.

(7) Overall Configuration

An air conditioning system 1 according to the third embodiment is the same as the air conditioning system 1 according to the second embodiment in that the air conditioning system 1 according to the third embodiment includes the centralized controller 10 to the third indoor units 123, namely, a first-layer device, a first intermediary device, and second-layer devices. In the air conditioning system 1 according to the third embodiment, the fourth indoor units 124, which are third-layer devices, the second intermediary unit 160, which is a second intermediary device, and a physical third line 503 are added to the air conditioning system 1 according to the second embodiment.

In the air conditioning system 1 according to the third embodiment, the third line 503 is connected to the plurality of fourth indoor units 124.

The second intermediary unit 160 includes a second filter 161. The second filter 161 is always connected to the second line 502 and the third line 503. The second intermediary unit 160 communicates with the centralized controller 10, which is a first-layer device, and also communicates with the outdoor unit 210, which is a first intermediary device, and the plurality of outdoor units 220 and the plurality of third indoor units 123, which are second-layer devices. The relationship between a first signal and a second signal, which are used for communication in the air conditioning system 1, and the relationship between these signals and the second filter 161 are similar to the relationship between the first signal and the second signal according to the second embodiment and the relationship between these signals and the first filter 151. The second filter 161 does not attenuate a high-frequency first signal, and attenuates a low-frequency second signal. The second filter 161 is installed so as not to attenuate a high-frequency first signal and so as to attenuate a low-frequency second signal, which indicates that, for example, the second filter 161 is installed so that the attenuation factor for the high-frequency first signal is smaller than the attenuation factor for the low-frequency second signal. The second intermediary unit 160 is configured to be capable of communicating with outdoor unit 210, which is a first intermediary device, via a second signal.

Like the first filter 151, the second filter 161 can include, for example, a capacitor, an attenuator that attenuates low-frequency signals, an active filter, and a switching device that disconnects the second line 502 and the third line 503 from each other to carry a low-frequency signal over the second line 502 and the third line 503. The switching device can be implemented using, for example, a relay.

(8) Overview of Air Conditioning Operation of Air Conditioning System 1 According to Third Embodiment In the air conditioning system 1 according to the third embodiment, refrigerant circulates among the outdoor unit 210, the plurality of outdoor units 220, the plurality of third indoor units 123, the second intermediary unit 160, and the fourth indoor units 124. In the air conditioning system 1, a vapor compression refrigeration cycle is performed by such circulation of the refrigerant. In the air conditioning system 1, the circulation of the refrigerant causes thermal energy transfer between the outdoor units 210 and 220, the third indoor units 123, and the fourth indoor units 124. The third indoor units 123 and the fourth indoor units 124 each includes a heat exchanger (not illustrated). In each of the third indoor units 123 and the fourth indoor units 124, the heat exchanger exchanges heat between the refrigerant and indoor air to perform at least one of cooling, heating, and dehumidification of the indoor space.

(9) Detailed Configuration (9-1) Configuration of Air Conditioning System 1 for Communication The centralized controller 10, the outdoor controller 56 of the outdoor unit 210, the outdoor controllers 57 of the outdoor units 220, and the indoor controllers 65 of the third indoor units 123 have been described in the second embodiment, and the description thereof is thus omitted here. Further, the intermediary controller 70 included in the second intermediary unit 160 has the same configuration as that of the intermediary controller 70 of the first intermediary unit 150, and the description thereof is thus omitted here. The transceivers 10c, 56c, 57c, 65c, and 70c perform communication via high-frequency first signals. The transmitter 10b and the receiver 56b perform communication via low-frequency second signals, the transmitter 56d and the receivers 57b and 65b perform communication via low-frequency second signals, and the transmitter 70d and the receivers 65b perform communication via low-frequency second signals.

(9-2) Communication for System Recognition

In communication for system recognition according to the third embodiment, the recognition of a first-layer device by the centralized controller 10 and the recognition of a second-layer device by the outdoor unit 210 can be performed in a way similar to that in the communication for system recognition according to the second embodiment described above. In the communication for system recognition according to the third embodiment, the recognition of a third-layer device by the second intermediary unit 160 can be performed by an operation similar to that in the recognition of a second-layer device by the first intermediary unit 150 according to the first embodiment.

Figure 3:
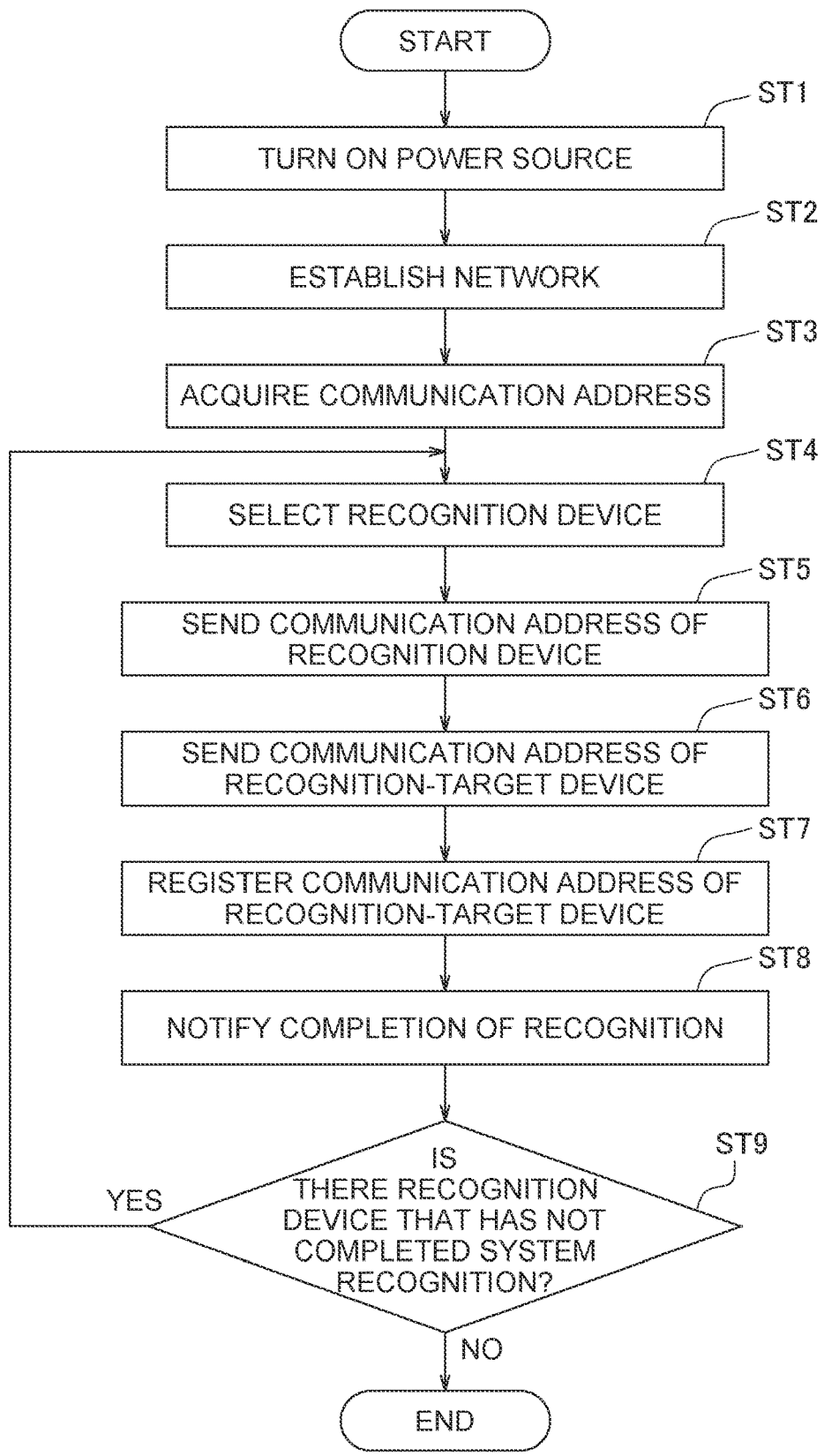
FIG. 3 is a flowchart for illustrating communication for system recognition in the air conditioning system.

In step ST9 in FIG. 3 for determining whether there is a recognition device that has not completed system recognition, it is assumed that the centralized controller 10 and the outdoor unit 210 have completed system recognition and the second intermediary unit 160 has not completed system recognition. In this case (Yes in step ST9), the centralized controller 10, the outdoor unit 210, and the second intermediary unit 160 cooperate with each other via communication using the transceivers 10c, 56c, and 70c and select the second intermediary unit 160 as a recognition device (step ST4).

When the second intermediary unit 160 is selected as a recognition device, the second intermediary unit 160 changes the role from a recognition-target device to a recognition device. The selected second intermediary unit 160 uses the transmitter 70d to transmit a second signal to devices in a layer lower than the layer of the second intermediary unit 160 through the third line 503 (step ST5). Due to the attenuation effect of the second filter 161, the receivers 65b of the third indoor units 123 are not allowed to receive the second signal transmitted from the transmitter 70d of the intermediary controller 70 of the second intermediary unit 160. The second intermediary unit 160 transmits its communication address via a first signal by using the transceiver 70c simultaneously with the transmission of the second signal or before or after the transmission of the second signal. In this case, the second intermediary unit 160 may be configured to send the communication address via a low-frequency signal having a frequency other than 0. The plurality of fourth indoor units 124, which have received the second signal at the receivers 65b through the third line 503 and have received the communication address of the second intermediary unit 160 at the transceivers 65c or the receivers 65b, store the received communication address in memories of the respective MCUs 65a.

The plurality of fourth indoor units 124, which have received the second signal and the communication address of the second intermediary unit 160, transmit their communication addresses to the communication address of the second intermediary unit 160 (step ST6). The second intermediary unit 160 registers the communication addresses of the plurality of fourth indoor units 124, which are sent through the third line 503, in the same system list in which third-layer devices in the third layer are registered (step ST7).

The second intermediary unit 160 notifies, upon completion of the registration of all of the fourth indoor units 124 in the third layer, the entire network that the system recognition for the third layer is completed (step ST8). The second intermediary unit 160 notifies the entire network that the system recognition for the third layer is completed through the first line 501, the second line 502, and the third line 503 by using the transceiver 70c. At this time, the second intermediary unit 160 transmits the communication addresses of the fourth indoor units 124 in the third layer to the MCU 56a of the outdoor controller 56 of the outdoor unit 210 through the second line 502 by using the transceiver 70c. The outdoor unit 210 registers the communication addresses of the plurality of fourth indoor units 124, which are received from the second intermediary unit 160, in the same system list as the communication addresses of third-layer devices. The MCU 56a of the outdoor controller 56 of the outdoor unit 210 transmits the communication addresses of the fourth indoor units 124 in the second layer to the MCU 10a of the centralized controller 10 through the first line 501 by using the transceiver 56c. The centralized controller 10 registers the communication addresses of the plurality of fourth indoor units 124, which are received from the outdoor unit 210, in the same system list as the communication addresses of third-layer devices.

In the air conditioning system 1 according to the third embodiment, the centralized controller 10 is a recognition device, and the outdoor unit 210 and the second intermediary unit 160 are devices having two aspects, namely, a recognition device and a recognition-target device. In the third embodiment, the plurality of outdoor units 220, the plurality of third indoor units 123, and the plurality of fourth indoor units 124 are recognition-target devices.

(10) Modifications (10-1) Modifications 1A, 2A, and 3A

In the first embodiment, the second embodiment, and the third embodiment described above, the air conditioning system 1 has been described as a network system, by way of example. However, the network system is not limited to an air conditioning system. Examples of the network system to which the technology of the present disclosure is applicable include a hot-water supply system and a ventilation system.

(10-2) Modifications 1B, 2B, and 3B

Figure 6:
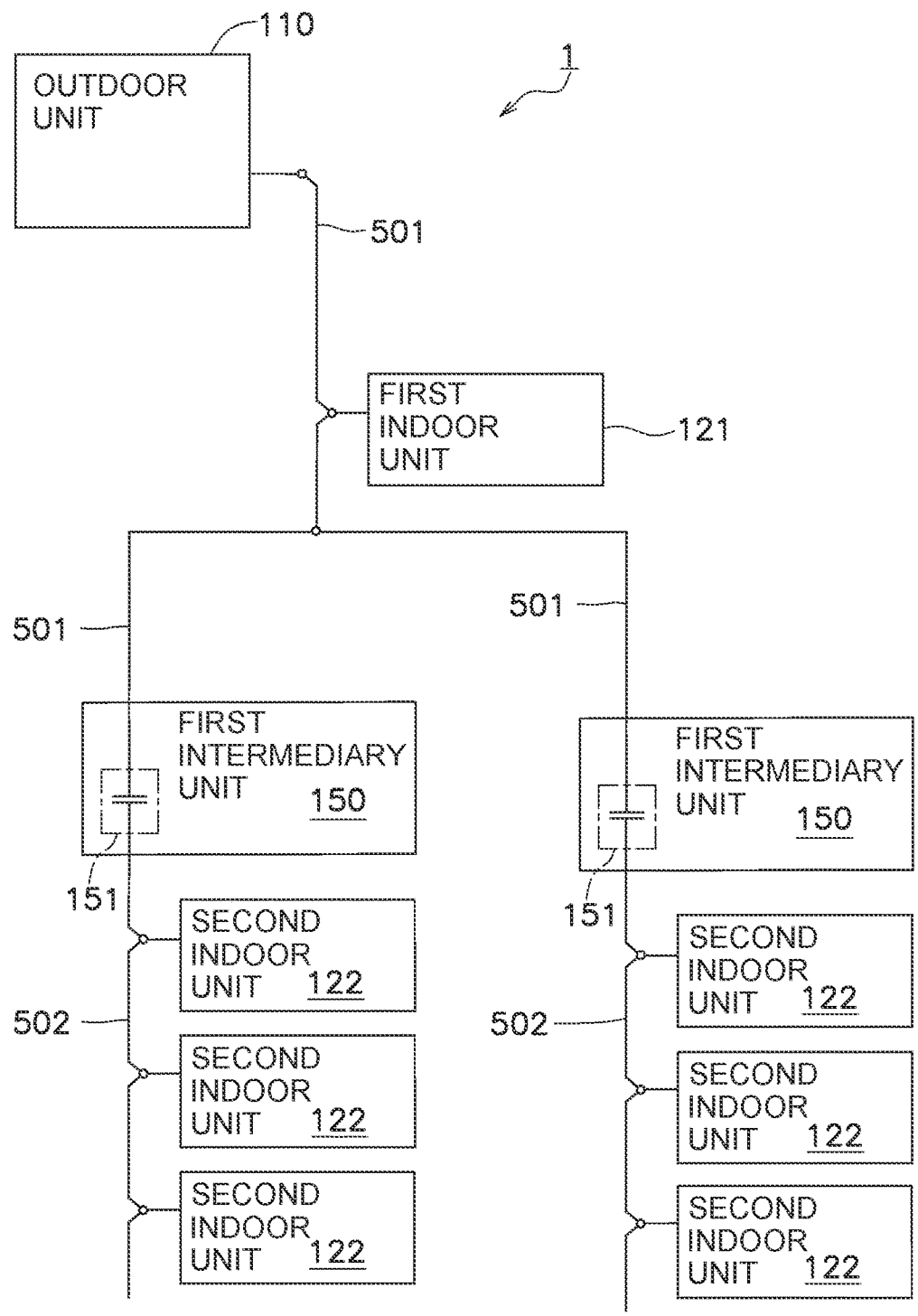
FIG. 6 is a circuit diagram illustrating an overview of an example configuration of an air conditioning system according to a modification.

In the first embodiment, the second embodiment, and the third embodiment described above, a case has been described in which a first intermediary device and second-layer devices are provided only in one row. Alternatively, a first intermediary device and second-layer devices can be configured to be provided in a plurality of rows in parallel. For example, as in an air conditioning system 1 illustrated in FIG. 6, a first intermediary device and second-layer devices may be configured to be provided in a plurality of rows in parallel. In the air conditioning system 1 in FIG. 6, two first intermediary units 150, which are first intermediary devices, are connected to the first line 501. Each of the first intermediary units 150 is connected to three second indoor units 122 by the second line 502.

(10-3) Modifications 1C, 2C, and 3C

In the first embodiment, the second embodiment, and the third embodiment described above, a case has been described in which the first intermediary device is the first intermediary unit 150 or the outdoor unit 210. However, the first intermediary device is not limited to such devices. For example, the first intermediary device may be implemented using a power supply unit that supplies a direct-current voltage or an alternating-current voltage to indoor units.

(10-4) Modifications 1D, 2D, and 3D

Figure 8:
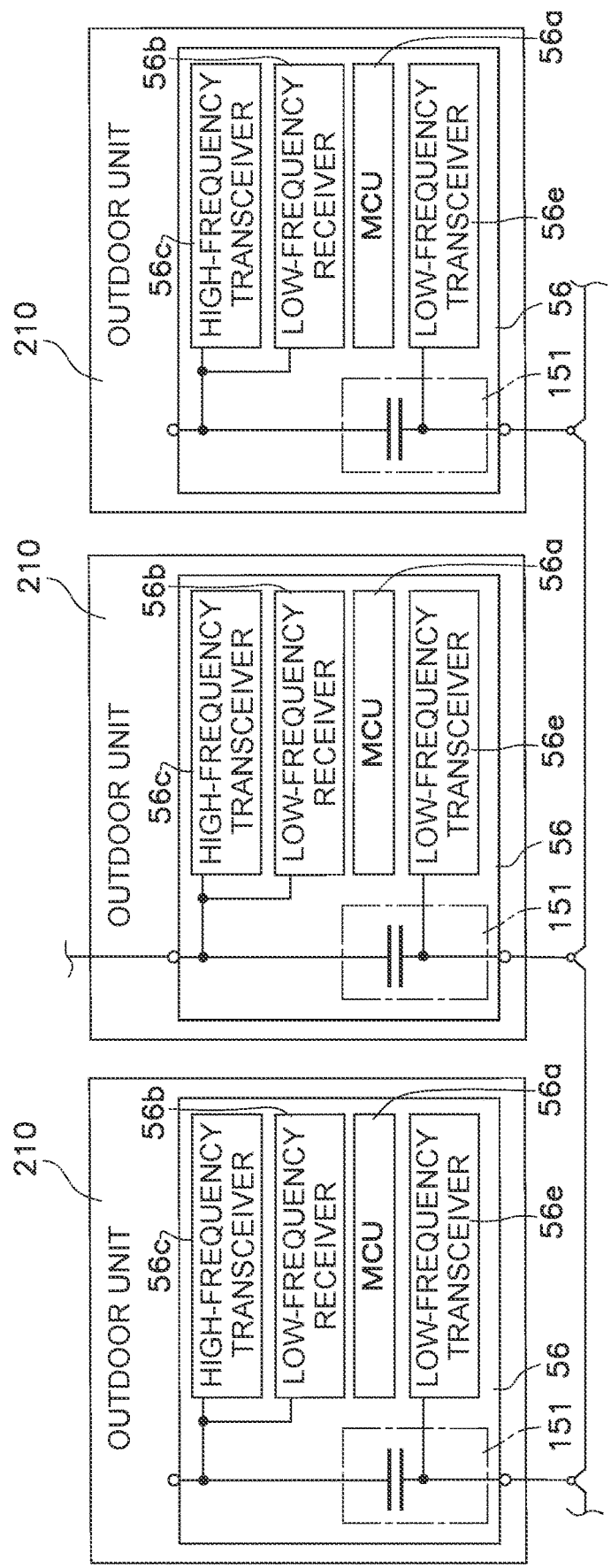
FIG. 8 is a block diagram for illustrating an overview of another example configuration of an air conditioning system according to a modification.

In the first embodiment, the second embodiment, and the third embodiment described above, a case has been described in which the first intermediary unit 150 and/or the outdoor units 110 and 210 include the transmitters 55b, 56d, and 70d that transmit low-frequency signals. However, in some cases, a device for performing recognition is not determined before the air conditioning system 1 is constructed. For example, as illustrated in FIG. 8, after a plurality of outdoor units 210 are connected, an outdoor unit 210 on the side that performs recognition and an outdoor unit 210 on the side that is recognized may be determined. To address this case, each of the plurality of outdoor units 210 can be configured to include a low-frequency transceiver 56e, in place of a low-frequency transmitter, for system recognition (see FIG. 8). In the air conditioning system 1, an intermediary device, such as the first intermediary unit 150, can also be configured to include a low-frequency transceiver for system recognition.

(10-5) Modifications 2E and 3E

Figure 9:
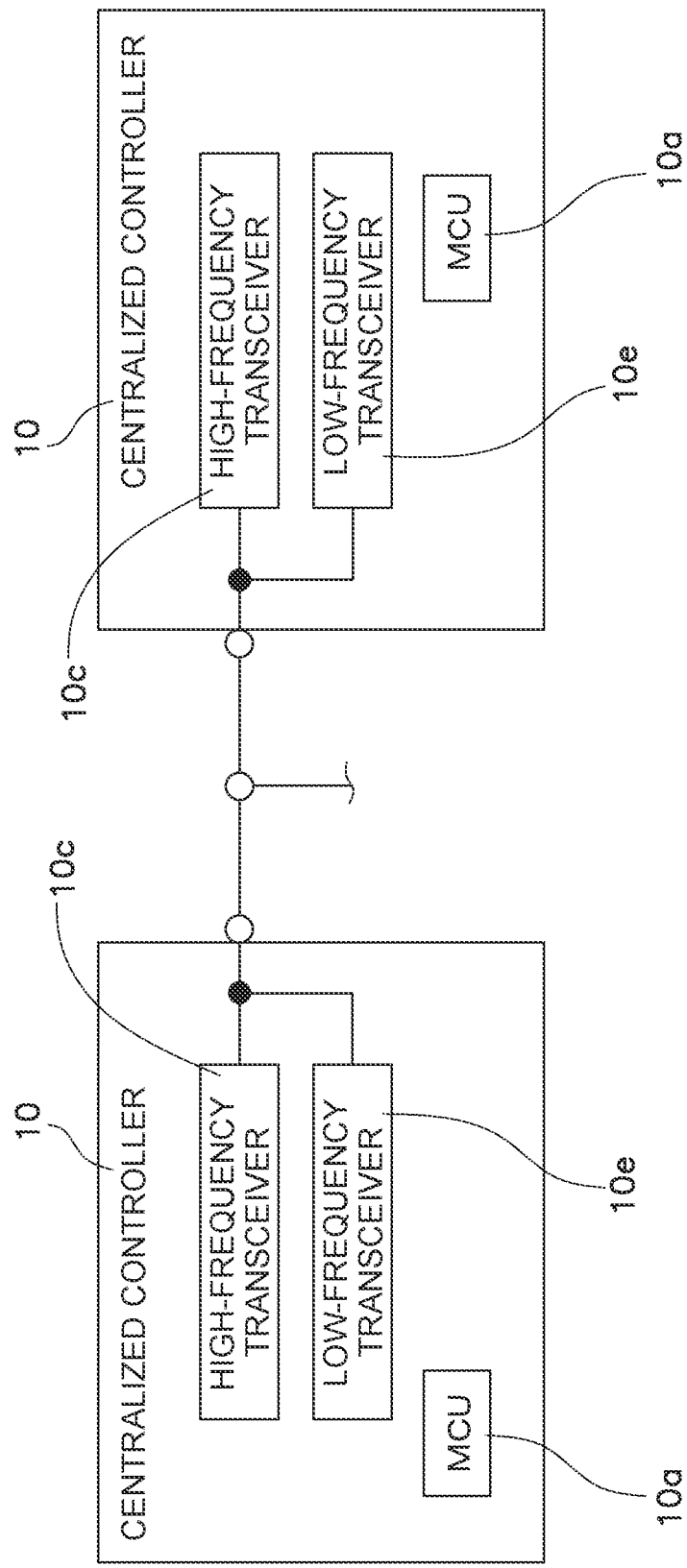
FIG. 9 is a block diagram for illustrating an overview of another example configuration of an air conditioning system according to a modification.

In the second embodiment and the third embodiment described above, a case has been described in which the centralized controller 10 includes the transmitter 10b that transmits a low-frequency signal. However, in some cases, a device for performing recognition is not determined before the air conditioning system 1 is constructed. For example, as illustrated in FIG. 9, after a plurality of centralized controllers 10 are connected, a centralized controller 10 on the side that performs recognition and a centralized controller 10 on the side that is recognized may be determined. To address this case, each of the plurality of centralized controllers 10 can be configured to include a low-frequency transceiver 10e, in place of a low-frequency transmitter, for system recognition (see FIG. 9).

(10-6) Modification 3F

Figure 7:
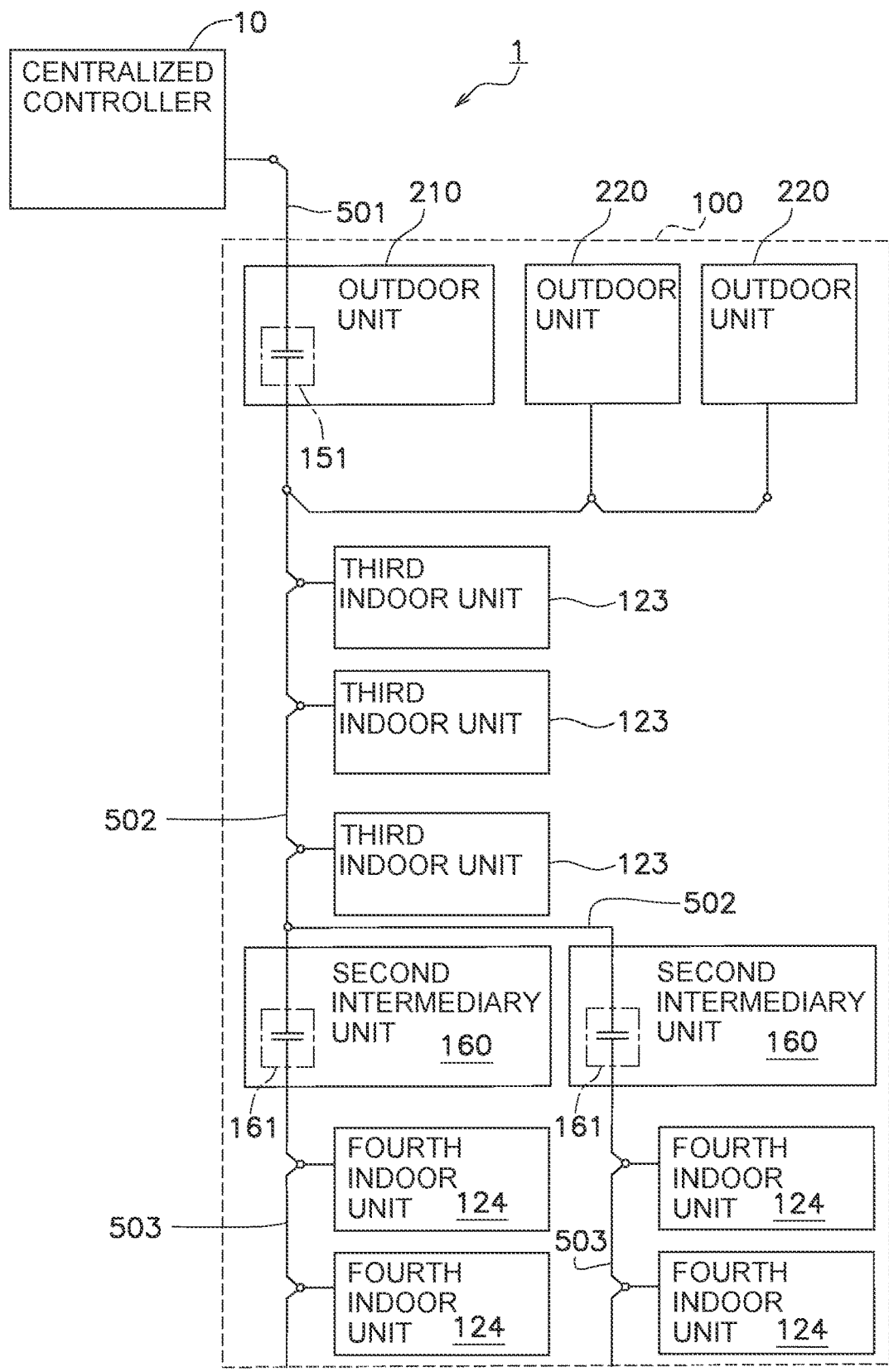
FIG. 7 is a circuit diagram illustrating an overview of another example configuration of an air conditioning system according to a modification.

In the third embodiment described above, a case has been described in which a second intermediary device and third-layer devices are provided only in one row. However, a second intermediary device and third-layer devices can be configured to be provided in a plurality of rows in parallel. For example, as in an air conditioning system 1 illustrated in FIG. 7, a second intermediary device and third-layer devices may be configured to be provided in a plurality of rows in parallel. In the air conditioning system 1 in FIG. 7, two second intermediary units 160, which are second intermediary devices, are connected to the second line 502. Each of the second intermediary units 160 is connected to two fourth indoor units 124 by the third line 503.

(10-7) Modification 3G

In the third embodiment described above, a case has been described in which the second intermediary device is the second intermediary unit 160. However, the second intermediary device is not limited to this. For example, the second intermediary device may be implemented using a power supply unit that supplies a direct-current voltage or an alternating-current voltage to indoor units.

(11) Features (11-1)

In the air conditioning system 1, which is a network system according to the embodiments described above or the modifications thereof, the first line 501 and the second line 502 can always be connected by the first filter 151. In the air conditioning system 1 according to the first embodiment or the modification illustrated in FIG. 1 or FIG. 6, therefore, even if a failure has occurred in the first intermediary unit(s) 150, which is a first intermediary device, a state can be maintained in which communication is possible between the outdoor unit 110, which is a first-layer device, and the plurality of second indoor units 122, which are second-layer devices. Further, in the air conditioning system 1 according to the second embodiment, the third embodiment, or the modification illustrated in FIG. 4, FIG. 5, or FIG. 7, even if a failure has occurred in the outdoor unit 210, which is a first intermediary device, a state can be maintained in which communication is possible between the centralized controller 10, which is a first-layer device, and the plurality of outdoor units 220 and the plurality of third indoor units 123, which are second-layer devices. Accordingly, the air conditioning system 1 can improve the reliability of communication.

(11-2)

In particular, in a case where second-layer devices are the plurality of second indoor units 122 or the plurality of third indoor units 123, for example, even if a failure such as a breakdown occurs in the first intermediary unit 150 or the outdoor unit 210, which is a first intermediary device, the outdoor unit 110 or the centralized controller 10 can maintain control. For example, the outdoor unit 110 or the centralized controller 10 can use a first signal to stop the operation of the plurality of second indoor units 122 or the plurality of third indoor units 123 through the first line 501 and the second line 502 or change the opening degrees of the expansion valves while operating the plurality of second indoor units 122 or the plurality of third indoor units 123.

(11-3)

In the air conditioning system 1 according to the third embodiment described above or the modifications thereof, the second line 502 and the third line 503 are always connected by the second filter(s) 161. In the air conditioning system 1 according to the third embodiment or the modification thereof illustrated in FIG. 5 or FIG. 7, therefore, even if a failure has occurred in the second intermediary unit(s) 160, which is a second intermediary device, a state can be maintained in which communication is possible between the centralized controller 10, which is a first-layer device, and the outdoor unit 210, which is a first intermediary device, and the plurality of fourth indoor units 124, which are third-layer devices. Accordingly, the air conditioning system 1 according to the third embodiment or the modification thereof can improve the reliability of communication.

(11-4)

In the air conditioning system 1 according to the embodiments described above or the modifications thereof, in particular, in a case where a first-layer device is the outdoor unit 110 or the centralized controller 10, even if a failure has occurred in the first intermediary unit 150 the outdoor unit 210, and/or the second intermediary unit(s) 160 which is a first intermediary device and/or a second intermediary device, a state can be maintained in which the outdoor unit 110 or the centralized controller 10 can communicate with the first indoor unit 121, the second indoor units 122, the third indoor units 123, and the fourth indoor units 124. As a result, it is possible to prevent a failure caused by the outdoor unit 110 or the centralized controller 10 being no longer able to control the first indoor unit 121, the second indoor units 122, the third indoor units 123, and the fourth indoor units 124.

(11-5)

The outdoor unit 110 or the centralized controller 10, which is a first-layer device, of the air conditioning system 1 can recognize the second indoor units 122 or the third indoor units 123, which are second-layer devices, connected to the first intermediary unit 150 or the outdoor unit 210, which is a first intermediary device, by the second line 502 by using the first intermediary unit 150 or the outdoor unit 210. Therefore, for example, even if another device is connected between the outdoor unit 110 or the centralized controller 10 and the first intermediary unit 150 or the outdoor unit 210, the outdoor unit 110 or the centralized controller 10 can recognize and manage the second indoor units 122 or the third indoor units 123 in a way distinguishable from the other device.

While embodiments of the present disclosure have been described, it will be understood that forms and details can be changed in various ways without departing from the spirit and scope of the present disclosure as recited in the claims.

REFERENCE SIGNS LIST

1 air conditioning system (example of network system)
10 centralized controller (example of first-layer device)

110 outdoor unit (example of first-layer device)
121 first indoor unit (example of first-layer device)
122 second indoor unit (example of second-layer device)
123 third indoor unit (example of second-layer device)
150 first intermediary unit (example of first intermediary device)
151 first filter
160 second intermediary unit (example of second intermediary device)
161 second filter
210 outdoor unit (example of first intermediary device)
220 outdoor unit (example of second-layer device)
501 first line
502 second line
503 third line

CITATION LIST

Patent Literature

PTL 1: Japanese Unexamined Patent Application Publication No. 2016-219983

The invention claimed is:

1. A network system comprising:
a first-layer device;
a first line connected to the first-layer device;
a second-layer device;
a second line connected to the second-layer device; and
a first intermediary device including a first filter directly connected to the first line connected to the first-layer device and directly connected to the second line connected to the second-layer device, the first intermediary device being configured to communicate with the first-layer device via the first line and the second-layer device via the second line, wherein
the first-layer device is a centralized controller to control the second-layer device or an outdoor unit to control the second-layer device, and
the first filter is configured so as not to attenuate a high-frequency first signal used for communication among the first-layer device, the first intermediary device, and the second-layer device such that the high-frequency communications signal between the first-layer device and the second-layer device passes through the filter and so as to attenuate a low-frequency second signal used for communication between the first intermediary device and the second-layer device such that the low-frequency communication signal between the first intermediary device and the second-layer device do not pass through the filter to the first-layer device a centralized controller to control the first-layer device and the second-layer device.

2. The network system according to claim 1, wherein the second-layer device is a plurality of indoor units that air-condition an inside of a room.

3. The network system according to claim 1, further comprising:
a third-layer device;
a third line connected to the third-layer device; and
a second intermediary device including a second filter directly connected to the second line connected to the second-layer device and directly connected to the third line connected to the third-layer device, the second intermediary device being configured to communicate with the first intermediary device via the second line and the third-layer device via the third line, wherein
the second filter is configured so as not to attenuate the high-frequency first signal used for communication among the first-layer device, the first intermediary device, the second-layer device, the second intermediary device, and the third-layer device such that the high-frequency communication signal between the first-layer device and the third-layer device passes through the second filter and so as to attenuate a low-frequency third signal used for communication between the second intermediary device and the third-layer device such that the low-frequency communication signal between the second intermediary device and the third-layer device do not pass through the filter to the first-layer device, the first intermediary device, and the second-layer device.

4. The network system according to claim 3, wherein the outdoor unit or the centralized controller controls third-layer device.

5. The network system according to claim 1, wherein
the first intermediary device recognizes the second-layer device using the second signal, and
the first-layer device recognizes the second-layer device via communication with the first intermediary device.

6. The network system according to claim 1, wherein
the first-layer device includes a first transceiver connected to the first line to perform communication via the high-frequency first signal, and a first transmitter or a first receiver connected to the first line to perform communication via the low-frequency second signal,
the second-layer device includes a second transceiver connected to the second line to perform communication via the first signal, and a second receiver connected to the second line to perform communication via the second signal, and
the first intermediary device includes a third transceiver connected to the first line to perform communication via the first signal, a third receiver connected to the first line to perform communication via the second signal, and a second transmitter connected to the second line to perform communication via the second signal.

7. The network system according to claim 2, further comprising:
a third-layer device;
a third line connected to the third-layer device; and
a second intermediary device including a second filter directly connected to the second line connected to the second-layer device and directly connected to the third line connected to the third-layer device, the second intermediary device being configured to communicate with the first intermediary device via the second line and the third-layer device via the third line, wherein
the second filter is configured so as not to attenuate the high-frequency first signal used for communication among the first-layer device, the first intermediary device, the second-layer device, the second intermediary device, and the third-layer device such that the high-frequency communication signal between the first-layer device and the third-layer device passes through the second filter and so as to attenuate a low-frequency third signal used for communication between the second intermediary device and the third-layer device; such that the low-frequency communication signal between the second intermediary device and the third-layer device do not pass through the filter to the first-layer device, the first intermediary device, and the second-layer device.

8. The network system according to claim 2, wherein
the first intermediary device recognizes the second-layer device using the second signal, and
the first-layer device recognizes the second-layer device via communication with the first intermediary device.

9. The network system according to claim 3, wherein
the first intermediary device recognizes the second-layer device using the second signal, and
the first-layer device recognizes the second-layer device via communication with the first intermediary device.

10. The network system according to claim 4, wherein
the first intermediary device recognizes the second-layer device using the second signal, and
the first-layer device recognizes the second-layer device via communication with the first intermediary device.

11. The network system according to claim 2, wherein
the first-layer device includes a first transceiver connected to the first line to perform communication via the high-frequency first signal, and a first transmitter or a first receiver connected to the first line to perform communication via the low-frequency second signal,
the second-layer device includes a second transceiver connected to the second line to perform communication via the first signal, and a second receiver connected to the second line to perform communication via the second signal, and
the first intermediary device includes a third transceiver connected to the first line to perform communication via the first signal, a third receiver connected to the first line to perform communication via the second signal, and a second transmitter connected to the second line to perform communication via the second signal.

12. The network system according to claim 3, wherein
the first-layer device includes a first transceiver connected to the first line to perform communication via the high-frequency first signal, and a first transmitter or a first receiver connected to the first line to perform communication via the low-frequency second signal,
the second-layer device includes a second transceiver connected to the second line to perform communication via the first signal, and a second receiver connected to the second line to perform communication via the second signal, and
the first intermediary device includes a third transceiver connected to the first line to perform communication via the first signal, a third receiver connected to the first line to perform communication via the second signal, and a second transmitter connected to the second line to perform communication via the second signal.

13. The network system according to claim 4, wherein
the first-layer device includes a first transceiver connected to the first line to perform communication via the high-frequency first signal, and a first transmitter or a first receiver connected to the first line to perform communication via the low-frequency second signal,
the second-layer device includes a second transceiver connected to the second line to perform communication via the first signal, and a second receiver connected to the second line to perform communication via the second signal, and
the first intermediary device includes a third transceiver connected to the first line to perform communication via the first signal, a third receiver connected to the first line to perform communication via the second signal, and a second transmitter connected to the second line to perform communication via the second signal.

14. The network system according to claim 5, wherein
the first-layer device includes a first transceiver connected to the first line to perform communication via the high-frequency first signal, and a first transmitter or a first receiver connected to the first line to perform communication via the low-frequency second signal,
the second-layer device includes a second transceiver connected to the second line to perform communication via the first signal, and a second receiver connected to the second line to perform communication via the second signal, and
the first intermediary device includes a third transceiver connected to the first line to perform communication via the first signal, a third receiver connected to the first line to perform communication via the second signal, and a second transmitter connected to the second line to perform communication via the second signal.

15. A network system comprising:
a first-layer device;
a first line connected to the first-layer device;
a second-layer device;
a second line connected to the second-layer device; and
a first intermediary device including a first filter directly connected to the first line connected to the first-layer device and directly connected to the second line connected to the second-layer device, the first intermediary device being configured to communicate with the first-layer device via the first line and the second-layer device via the second line, wherein
the second-layer device is a plurality of indoor units that air-condition an inside of a room, and
the first filter is configured so as not to attenuate a high-frequency first signal used for communication among the first-layer device, the first intermediary device, and the second-layer device such that the high-frequency communications signal between the first-layer device and the second-layer device passes through the filter and so as to attenuate a low-frequency second signal used for communication between the first intermediary device and the second-layer device such that the low-frequency communication signal between the first intermediary device and the second-layer device do not pass through the filter to the first-layer device.

* * * * *

UNITED STATES PATENT AND TRADEMARK OFFICE
CERTIFICATE OF CORRECTION

PATENT NO. : 11,585,556 B2
APPLICATION NO. : 17/599240
DATED : February 21, 2023
INVENTOR(S) : Shin Higashiyama et al.

It is certified that error appears in the above-identified patent and that said Letters Patent is hereby corrected as shown below:

In the Claims

Column 17; Lines 52-33; Claim 1:
Change:
"device a centralized controller to control the first -layer device and the second-layer device."
To:
--device.--

Signed and Sealed this
Tenth Day of October, 2023

Katherine Kelly Vidal
*Director of the United States Patent and Trademark Office*